(12) United States Patent
Farrell et al.

(10) Patent No.: US 6,847,460 B2
(45) Date of Patent: *Jan. 25, 2005

(54) ALIGNMENT AND CORRECTION TEMPLATE FOR OPTICAL PROFILOMETRIC MEASUREMENT

(75) Inventors: Colin T. Farrell, Green Valley, AZ (US); Anthony L. Martinez, Tuscon, AZ (US); Joanna Schmit, Tucson, AZ (US); Michael B. Krell, Tucson, AZ (US)

(73) Assignee: Veeco Instruments, Inc., Tucson, AZ (US)

( * ) Notice: Subject to any disclaimer, the term of this patent is extended or adjusted under 35 U.S.C. 154(b) by 203 days.

This patent is subject to a terminal disclaimer.

(21) Appl. No.: 10/262,057

(22) Filed: Oct. 1, 2002

(65) Prior Publication Data

US 2003/0035115 A1 Feb. 20, 2003

Related U.S. Application Data

(63) Continuation-in-part of application No. 09/585,370, filed on Jun. 1, 2000, now Pat. No. 6,459,489.

(51) Int. Cl.[7] .............................................. G02B 9/02
(52) U.S. Cl. ....................................... 356/508; 356/510
(58) Field of Search ................................. 356/508, 510, 356/497, 511, 512, 399, 400, 401

(56) References Cited

U.S. PATENT DOCUMENTS 5,680,213 A * 10/1997 Hunsaker et al. ........... 356/507
6,459,489 B1 * 10/2002 Farrell et al. ............... 356/508

* cited by examiner

*Primary Examiner*—Gregory J. Toatley, Jr.
*Assistant Examiner*—Patrick Connolly
(74) *Attorney, Agent, or Firm*—Antonio R. Durando; Quarles & Brady Streich Lang LLP

(57) ABSTRACT

An electronic template delineating distinct selected patterns corresponding to predetermined regions of interest in a sample part is used to limit analysis to those regions. The surface of the sample is first measured using conventional techniques. The data so acquired are used to identify boundaries between distinct regions, which are then compared to a predetermined pattern boundary in the template to find a best-fit match. The position of the pattern is then shifted to overlay the match, thereby automatically aligning the template's selected patterns with the regions of interest in the sample surface. As a result, profilometric analysis can be limited to the regions of interest. Correction factors are also assigned to each selected pattern in the template to account for physical differences in the corresponding regions of interest of the sample part that affect the profilometric measurement.

33 Claims, 11 Drawing Sheets

| Material Name | PSI Offset (nm) | VSI Offset (nm) | EVSI Offset (nm) |
|---|---|---|---|
| Glass | 0.0 | 0.0 | 0.0 |
| NiFe | -18.0 | -12.0 | -16.5 |
| Al2O3 | 12.0 | 8.0 | 9.5 |
| Gold | -20.0 | -15.0 | -18.5 |

FIG. 7

ALIGNMENT AND CORRECTION TEMPLATE FOR OPTICAL PROFILOMETRIC MEASUREMENT

RELATED APPLICATIONS

This application is a continuation-in-part application of U.S. Ser. No. 09/585,370, filed Jun. 1, 2000, now U.S. Pat. No. 6,459,489.

BACKGROUND OF THE INVENTION

1. Field of the Invention

This invention pertains to the general field of surface profiling and apparatus for aligning a sample surface to a template that defines regions of special interest. In particular, the invention provides a novel approach for matching the regions of interest in a test part to a corresponding template in order to effect the alignment of the part, and further utilizes the template for correcting measurement errors resulting from material and wavelength variations between adjacent regions in the part.

2. Description of the Prior Art

Parts that are measured by surface profilometry for quality control often contain distinct regions separated by a boundary delineating different properties, such as materially different heights, for example. The surface characteristics of some of these regions may be critical to the performance of the part, while others may be totally irrelevant. Therefore, it is typically preferable to measure only the regions of interest. Moreover, since speed of measurement is often an important aspect of this kind of testing, limiting the measurement to the regions of interest also enhances the efficiency of the testing procedure.

Copending U.S. Ser. No. 09/585,370, herein incorporated by reference, describes a method of alignment of a template utilized to identify the regions of interest on the surface of the test part. The method provides an electronic template representing the topography of the part being tested (i.e., a magnetic head) and delineating distinct patterns corresponding to particular regions of interest (such as ABS surfaces), so that analysis of the sample's surface can be limited to those regions. According to one aspect of the invention, the outline of the part positioned in a plastic tray within the field of view of an interferometric microscope is identified by measuring the modulation of incident light at each pixel inside and outside the contour of the part using the loci of perceivable fringe contrast as the criterion for establishing the location of the part edges. Once the outline of the part within the plastic tray is so established, the position of the part is shifted within the field of view coordinates to match the template, thereby automatically achieving a precise alignment of the template with the boundary of the slider. In turn, the template patterns also become aligned with the regions of interest in the test part and interferometric analysis can be limited to data corresponding to the pixels contained within those patterns.

As a result of this technique, the regions of interest in the test part are quickly identified and tested, avoiding the unnecessary steps of analyzing the remaining regions of the sample. According to another aspect of referenced invention, curve-fitting schemes are used to facilitate and expedite the process of identifying the contour of the test part. In the case of conventional magnetic-head sliders, which are substantially rectangular in plan view, straight-line fitting between a few data points along two adjacent edges is sufficient to find the location of the edges and the corner between them, which in turn can be used is straightforward manner to align the template with the slider.

The present invention is a further development in the art directed at generalizing the concepts disclosed in Ser. No. 09/585,370 to different profilometric techniques and to test surfaces having regions separated by distinct physical properties.

BRIEF SUMMARY OF THE INVENTION

It is therefore an objective of this invention to provide an automatic procedure for identifying regions of interest in a test sample, so that profilometric testing can be limited to such regions to provide a faster and more efficient testing capability.

Another objective of the invention is a generic procedure for aligning a sample surface with a template using boundaries between regions of different properties as the reference landmarks in the surface.

A further objective of the invention is that the testing procedure minimize manipulation of the test sample.

Another goal of the invention is its general application to profilometry instrumentation that requires alignment of the sample to a predetermined template, or vice versa, for the purpose of selectively testing only portions of the sample's surface.

Yet another objective of the invention is the use of the template for the purpose of providing measurement corrections to account for material dissimilarities and for different profilometric techniques, such as the different wavelengths used in phase-shifting and in vertical-scanning interferometry.

Finally, another goal is the implementation of the above mentioned objectives in commercially viable apparatus that maximizes the utilization of existing technology.

In accordance with these and other objectives, the preferred embodiment of this invention consists of providing an electronic template representing the topography of the sample part being tested and delineating distinct selected patterns corresponding to predetermined regions of interest in the part, so that analysis of the sample's surface can be limited to those regions. According to one aspect of the invention, the surface of the sample is first measured using a conventional profilometric technique. The data so acquired are used to identify the outlines of boundaries between regions of different physical properties, such as boundaries between regions of different heights. These region boundaries are then compared to a predetermined pattern boundary in the template and a best-fit match is selected using a conventional best-fit procedure. Once the pattern boundary in the template is matched to a region boundary in the sample surface, the position of the sample is shifted within the field of view coordinates to match the template, or vice versa, thereby automatically achieving a precise alignment of the selected patterns in the template with the regions of interest in the sample surface. As a result, the profilometric analysis can be limited to data corresponding to the pixels contained within the regions of interest.

According to another aspect of the invention, correction factors are assigned to each predetermined selected pattern in the template to account for physical differences in the corresponding regions of interest of the sample part that affect the profilometric measurement. Correction factors are similarly assigned to account for differences in the profilometric method being used for the measurement, such as the different wavelengths used with various interferometric procedures. Such correction factors may be provided in the form of a table stored in a computer memory for interactive assignment to pertinent selected patterns in the template by a user, or may be interactively assigned directly to each selected pattern by the user. Alternatively, an algorithm of general application may be stored in a computer for calculating correction factors as a function of data interactively provided by the user, such as material characteristics and/or light-source wavelengths. After the sample surface has been profiled, the pertinent correction factor is then applied to the region of interest corresponding to each selected pattern in the template.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

BRIEF DESCRIPTION OF THE DRAWINGS

FIG. 7 illustrates a table of measurement correction factors as a function of instrument wavelength and surface materials for use to correct interferometric measurements conducted with the template of the invention.

DETAILED DESCRIPTION OF THE INVENTION

This invention is based on the realization that the approach disclosed in U.S. Ser. No. 09/585,370 may be generalized for use with any profilometric technique so long as the sample surface being profiled contains distinct regions separated by identifiable boundaries. These boundaries and/or other features of the islands defined thereby can be used to find a match between a given landmark region in the sample surface a corresponding predetermined landmark pattern in the template. This match is then used to align the template with the sample surface so that the selected patterns in the template overlay the regions of interest in the sample surface.

Phase-shifting interferometry (PSI) is used herein to describe the invention by way of example, but those skilled in the art would readily recognize that the same concepts are also applicable to other profilometric techniques. For example, a boundary between regions may be found in equivalent fashion using modulation data in phase-shifting interferometry or using height data in atomic-force profilometry. Therefore, the invention is not intended to be limited to PSI applications. Rather, it is expected that it will provide equivalent advantages in vertical-scanning interferometry (VSI), extended vertical-scanning interferometry (also known in the art as "PSI on the fly"), confocal microscopy, optical-coherence tomographic profilometry, atomic-force profilometry, and stylus profilometry.

With reference to PSI, it is known that interference fringes between reflections from a sample surface and a reference surface exposed to a light beam occur only within the coherence length of the light, which is a function of bandwidth. It is also known that fringes are detected by a microscope objective only when the sample surface is within the focal depth of the objective. Therefore, when a sample surface contains a region separated by a sufficiently large height step from an adjacent region, interference fringes are produced only by the light reflected from the region that is within the focal depth of the microscope, while the adjacent region provides no measurable modulation. Accordingly, the boundary between the two regions is readily identified.

Exploiting this practical condition of normal interferometric measurement, the invention can be carried out by taking a measurement of at least a portion of the sample surface containing a region ("landmark region") having an identifiable size, shape or boundary that corresponds to the size, shape or boundary of a corresponding pattern ("landmark pattern") in an electronic template provided for the part being tested. It is noted that the landmark region will normally correspond to a region of interest for measurement purposes, but not necessarily so. The only important criterion is that the landmark region be identifiable by the profilometric procedure at hand and that its exact position within the sample surface be known.

Figure 1:
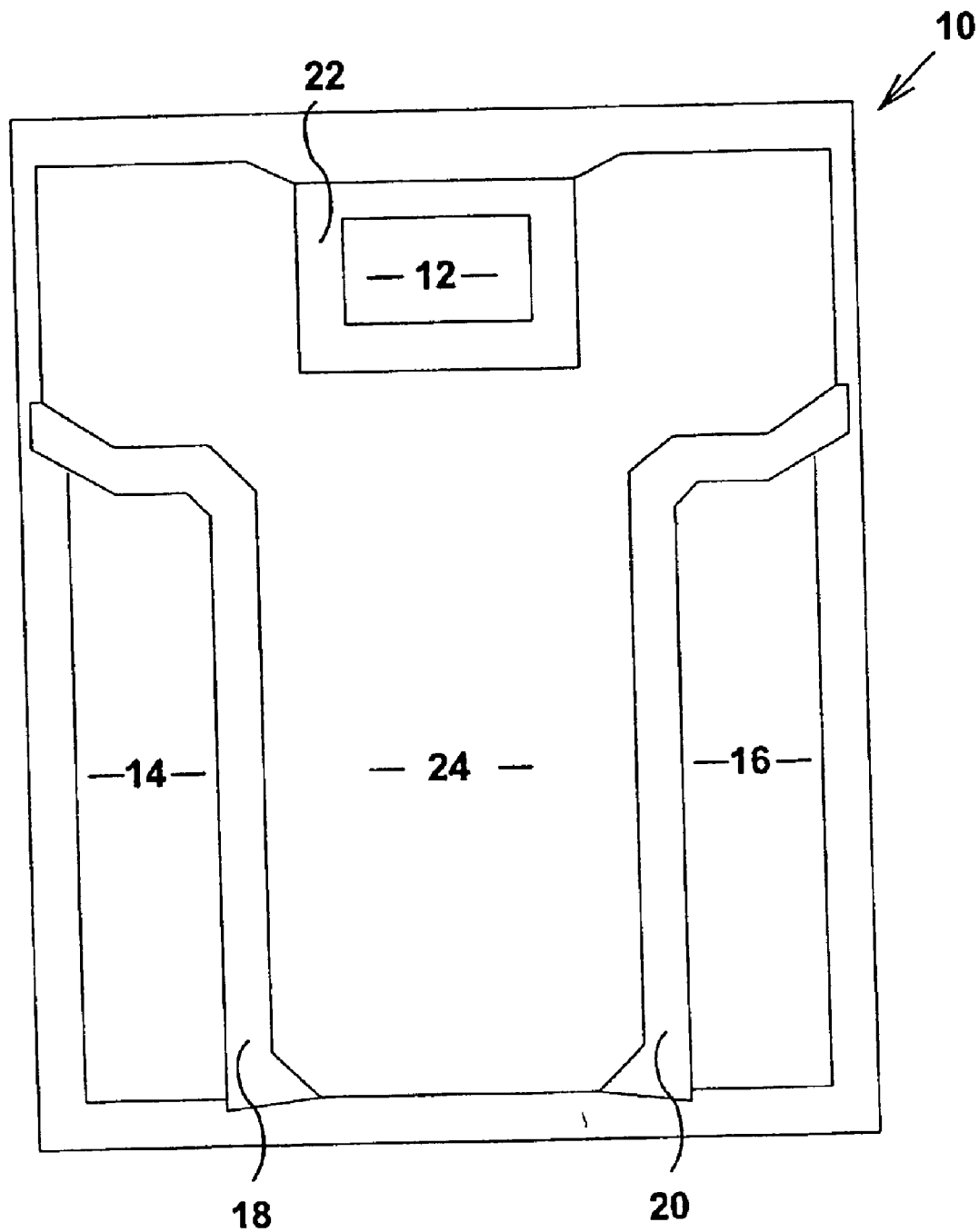
FIG. 1 is a schematic representation of the surface of a magnetic head, a typical sample part measured with the aid of a template.
Figure 2:
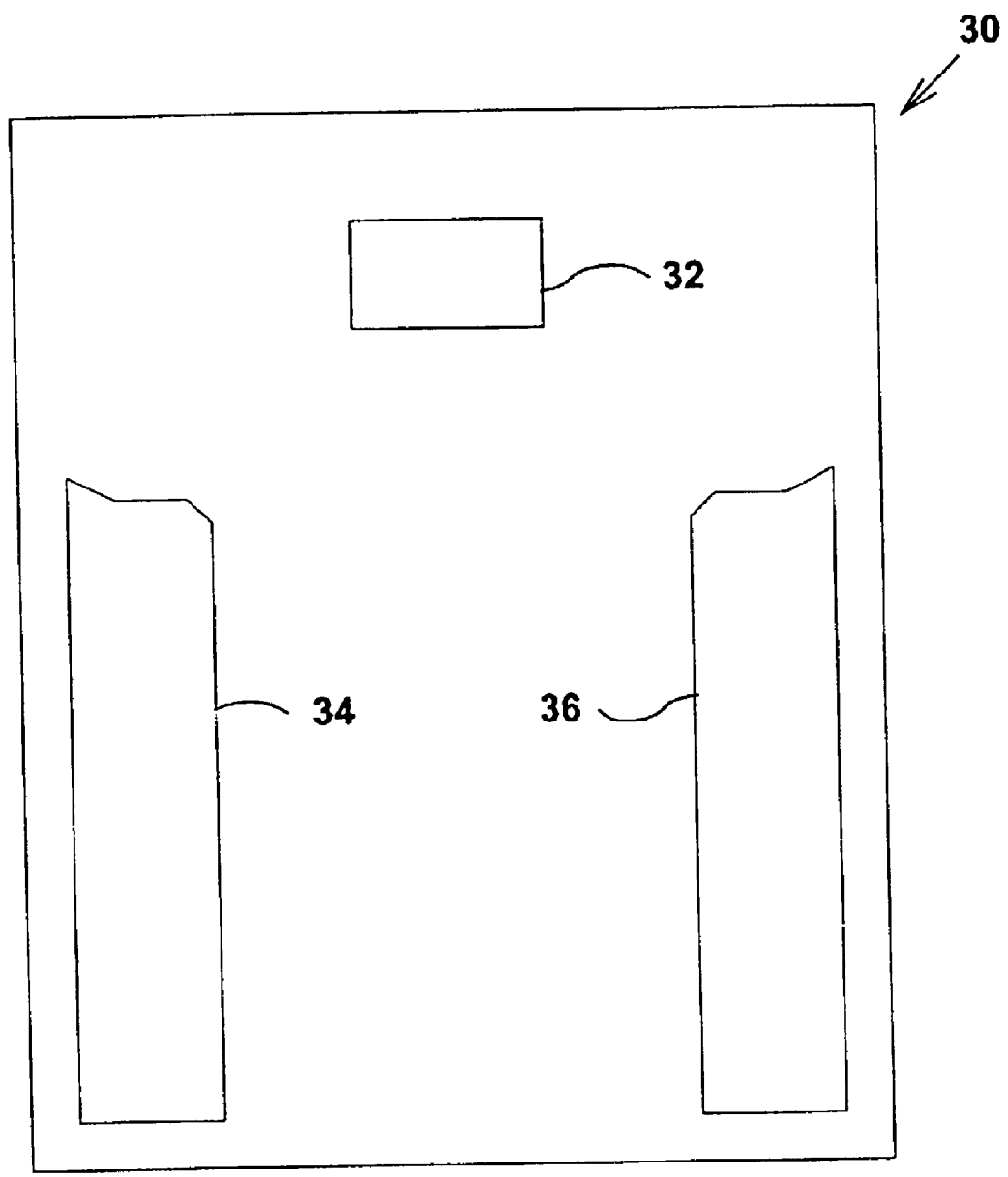
FIG. 2 is an illustration of a template designed to match certain distinct regions of interest, such as ABS regions, in the magnetic head of FIG. 1.

Based on the interferometric data collected by this initial measurement, modulation is calculated at each pixel and boundaries between islands of different height are identified by checking the value of the modulation calculated at each successive pixel in an arbitrary direction from a selected starting point within the field of view. Referring to FIG. 1, for example, the image of the surface 10 of a magnetic-head slider is shown to illustrate a sample surface with relatively high regions of interest 12, 14, 16 (ABS regions) contained within intermediate shallower regions 18, 20, 22 and a yet shallower background cavity 24. In order to limit the testing procedure to the regions of interest 12, 14, 16 (or any subsets thereof), an electronic template 30 is provided with patterns or islands 32, 34, 36 designed to match the expected relative location of ABS regions 12, 14, 16 in the samples surface 10, as shown in FIG. 2. Thus, prior to carrying out processing of the regions of interest, the template 30 must be aligned with the sample surface 10.

Figure 3:
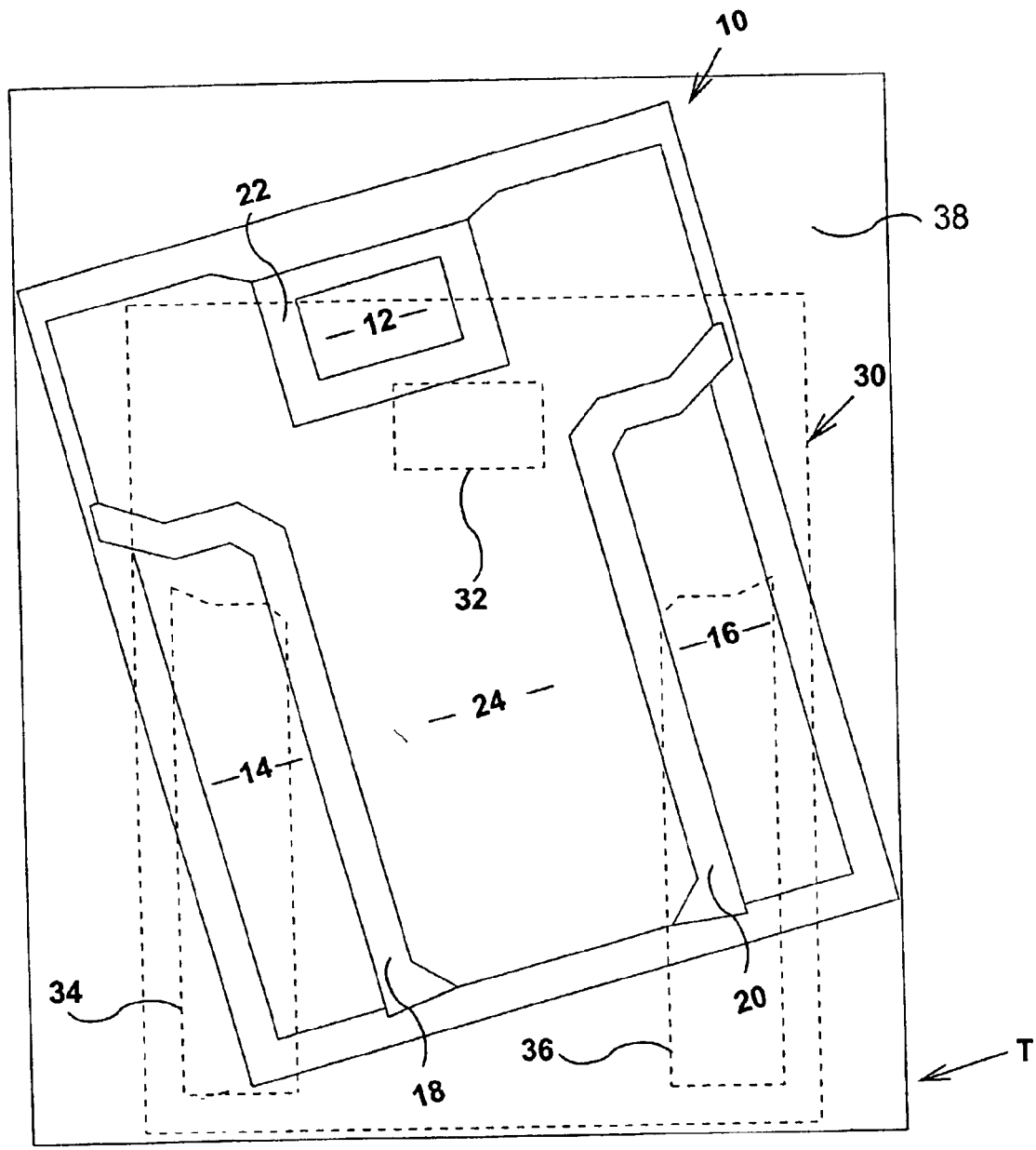
FIG. 3 illustrates the magnetic head of FIG. 1 placed within the field of view of an interferometric profiler and shows a typical misalignment with a corresponding electronic template provided to limit the measurement to particular regions of interest.

Since, as illustrated in FIG. 3, the position of the sample surface within the field of view 38 of the profilometric instrument cannot typically be set with perfect accuracy, it is necessary to locate it precisely before the template can be superimposed over it (or vice-versa) for the purpose of performing profilometry only over regions of interest. Thus, the area corresponding to a predetermined landmark region must first be identified among all possible alternatives in the sample surface.

Assuming, for instance, that the sample is positioned in a sample stage so that it appears in the field of view 38 of the profilometer as illustrated in FIG. 3, the landmark region in the sample surface 10 needs to be identified so that it can be matched with a corresponding feature, the landmark pattern, in the template 30. This connecting reference between the sample surface and the template can then be used to overlay the two and establish a direct correspondence also between all regions of interest 12, 14, 16 in the test surface and the selected patterns 32, 34, 36 in the template.

Figure 4:
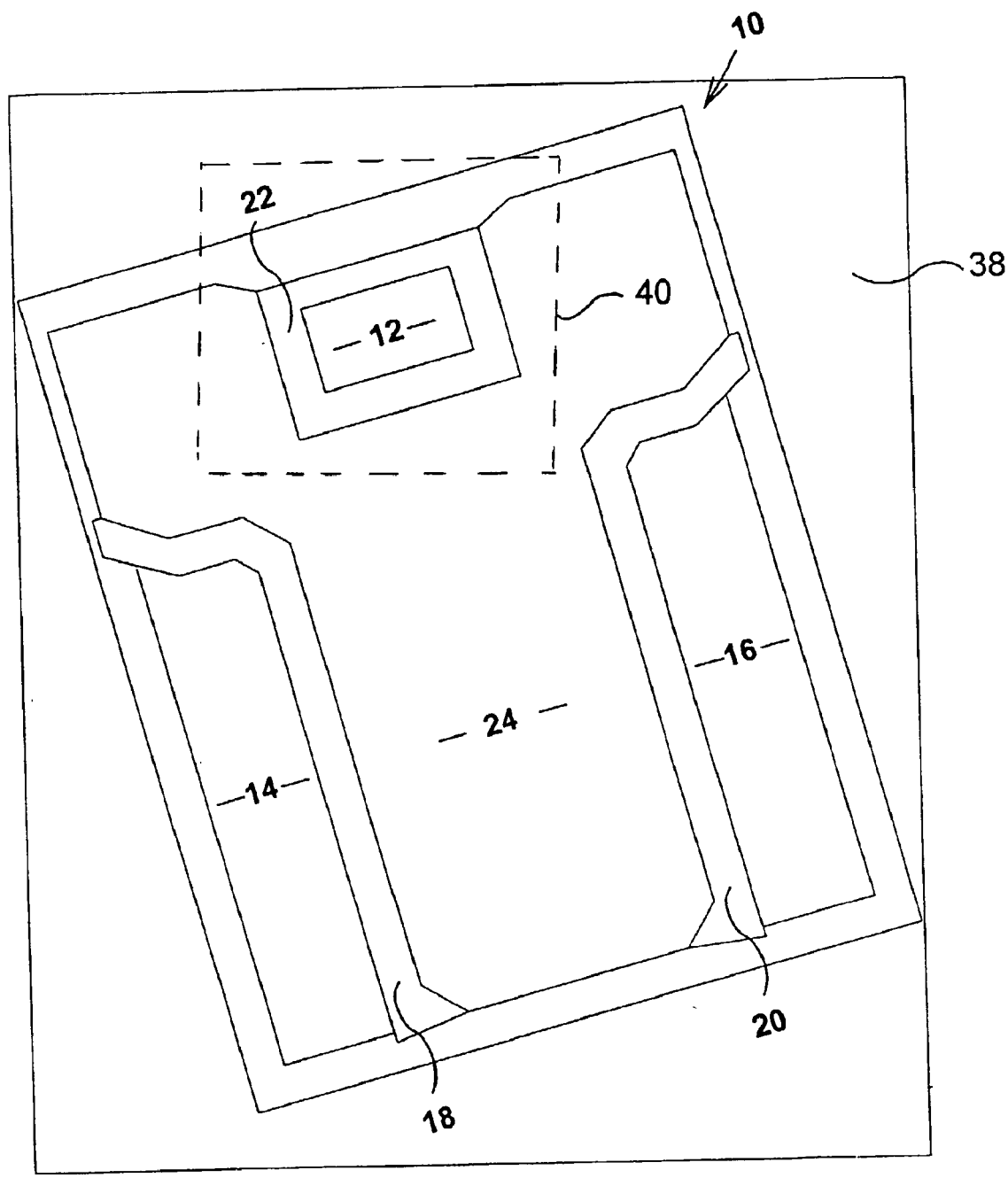
FIG. 4 shows a region of interest in the sample surface selected as a landmark region for the purposes of the present invention.

If, for example, the region 12 is selected to be used as the landmark region for the procedure of the invention (and correspondingly pattern 32 to be the landmark pattern in the template), the first step requires that it be identified and located within the field of view 38. This can be done, for example, by taking modulation measurements over the entire field of view, or only over a limited portion of the field of view where the landmark region 12 is expected to be found, such as illustrated by the area 40 in FIG. 4. As described in Ser. No. 09/585,370, only the islands of pixels corresponding to regions 12, 14, 16 will produce significant modulation data because of the difference in height between these regions and the rest of the sample surface. Instead of using modulation differences between adjacent pixels to identify the contour of uniform pixel islands, height differences, contrast differences, or slopes could be used in equivalent manner. Therefore, the outline (and consequently also its size and shape) and the position of region 12 can be identified simply by comparing the size and/or shape of any island of pixels with significant modulation (i.e., data corresponding to regions 12, 14 and 16) with the size and/or shape of the landmark pattern 32 in the template 30.

As one skilled in the art would readily recognize, this in general can be achieved, for example, by comparing the size of any island of contiguous pixels having significant modulation with the size of the landmark pattern 32 (as measured, for instance, by the total number of pixels in each island). Alternatively, or in addition, the identification procedure could be carried out by comparing the shapes of the boundaries (or portions of them) of all such islands with the shape of the boundary (or a portion thereof) of the landmark pattern 32. Once a close match is found (such as, for example, by finding the island that best meets a predetermined measure of size identity, or by finding the island boundary that best fits the boundary of region 32), then the template is positioned electronically so as to cause the landmark pattern 32 to coincide with the island of data presumed to correspond to the landmark region 12. The procedure consists of shifting the position of the electronic template through conventional coordinate translation techniques so that the coordinates of the landmark pattern 32 overlay the position of the landmark region 12. Inasmuch as the template used is designed to match the geometry of the slider 10 within manufacturing tolerances, the entire template 10, including the patterns 32, 34, 36 intended to represent the regions of interest 12, 14, 16, will overlay the slider 10 once the landmark pattern and the landmark region are matched. It is understood that the invention could be practiced in equivalent fashion by shifting the coordinates of the sample-surface data to match the position of the electronic template.

Figure 5:
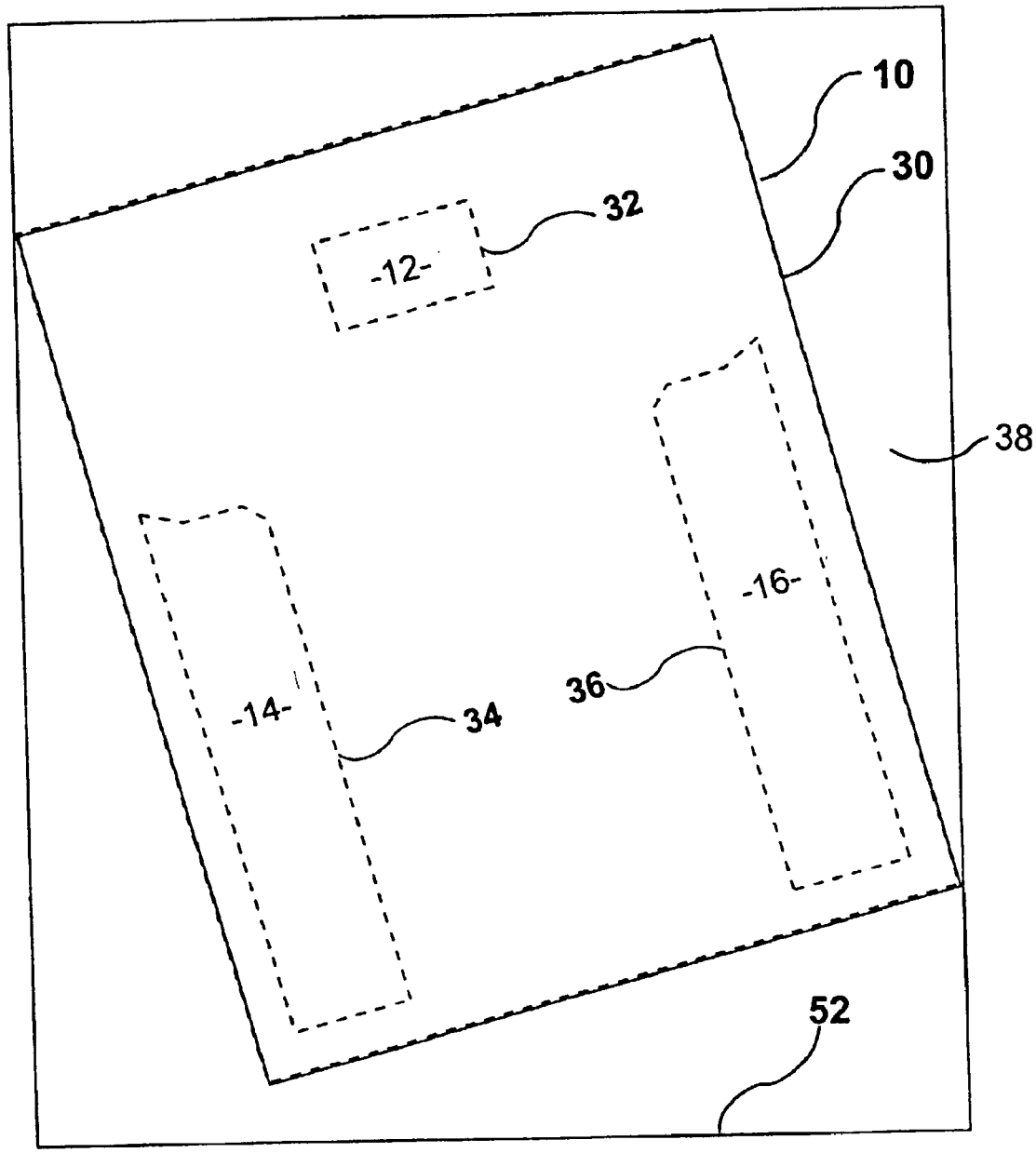
FIG. 5 shows the template of FIG. 2 superimposed on the magnetic head illustrated in FIG. 1.
Figure 6:
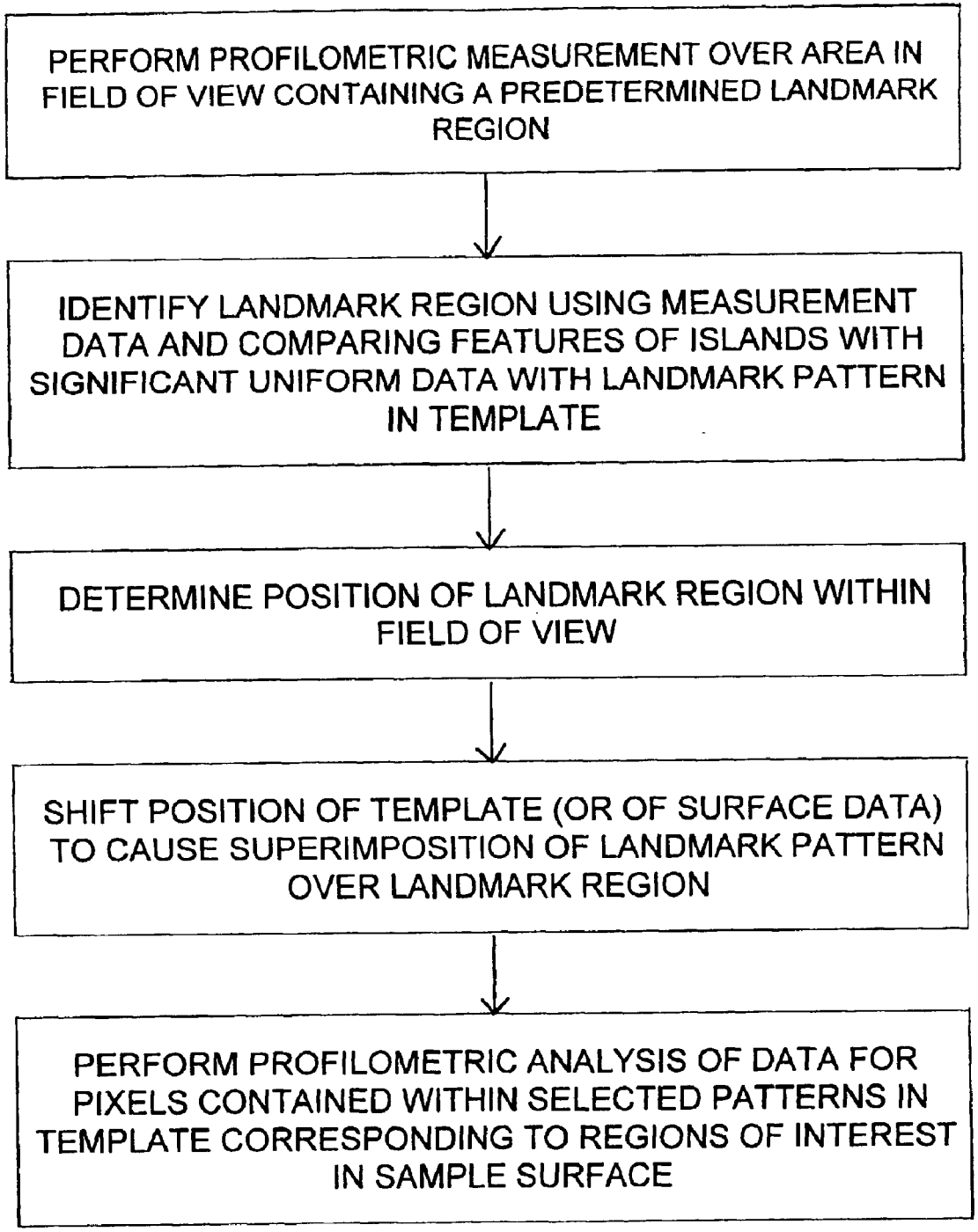
FIG. 6 is a flow chart of the steps of the procedure of the invention.

The result of this process is illustrated in FIG. 5. If the match is correct, obviously all selected patterns will lay over the regions of interest of the sample. Analysis of the interferometric data can then proceed by processing only those data that correspond to pixels contained within the regions of interest 12, 14, 16 in the magnetic head 10, which are automatically and precisely identified by their corresponding selected patterns in the template 30. The steps of the process of the invention are shown in FIG. 6.

According to another aspect of the invention, the electronic template 10 is also used to correct measurement errors that result from dissimilarities in the materials of the various regions of interest in the sample surface. When an optical profilometer is used, the measurement is a function of wavelength and material properties. Specifically, optical surface profilometers based on phase-shifting interferometry (PSI) utilize phase measurements to calculate the surface height values, h(x,y), at each point of a surface under test. The technique is founded on the concept of varying the phase difference between two coherent interfering beams of single wavelength in some known manner, such as by changing the optical path difference (OPD) in discrete steps or linearly with time. Under such conditions, three or more measurements of the light intensity at a pixel of a receiving sensor array can be used to determine the initial phase difference of the light beams at the point on the test surface corresponding to that pixel. Based on such measurements at each pixel of coordinates x and y, a phase distribution map $\Phi(x,y)$ can be determined for the test surface, from which very accurate height data h(x,y) are calculated by the following general equation in relation to the wavelength $\lambda$ of the light source used:

$$h(x, y) = \frac{\lambda}{4\pi} \Phi(x, y). \tag{1}$$

Phase-shifting interferometry provides a vertical resolution of the order of $1/100$ of a wavelength or better and is widely used for measuring opaque surfaces of similar (homogeneous) materials.

If the sample material is not dielectric (i.e., the extinction coefficient of the material is not zero), a phase change occurs on reflection from the sample (referred to in the art as Fresnel phase change on reflection). The phase changes on reflection from the surface of the sample vary with several parameters, including the optical constants of the material composing the surface of the sample. However, existing techniques for reconstructing surface profiles from phase measurements do not take into account phase changes that result from reflection of the light incident on the surface of the sample. This approximation is not a problem when the test sample's surface is made of similar material because the phase shift due to the optical parameters of the material is the same at each pixel. Since only relative phase changes from pixel to pixel are important for determining a surface profile, phase changes related to optical parameters can be neglected under these circumstances. On the other hand, when the sample surface is dissimilar (non-homogeneous), the optical-parameter variations from pixel to pixel result in nonuniform phase shifts that distort the measured surface profile. Therefore, unless these parameters are also known and accounted for, a correct profile measurement is improbable with conventional techniques.

The relationship between the phase change associated with a beam reflected at the interface between an incident medium (such as air) and a sample surface and the physical properties of the sample material is well understood in the art. For example, referring to the general case where a plane wave of monochromatic, linearly-polarized light of wavelength $\lambda$ is incident on the surface of an optically-opaque sample at an incidence angle $\theta_1$, the phase change $\Delta\phi$ of the beam reflected from the surface can be calculated by known equations having the following general functionality:

$$\Delta\phi_{TE} = f_{TE}(n, k, \theta_i, \lambda) \quad (2a)$$

$$\Delta\phi_{TM} = f_{TM}(n, k, \theta_1, \lambda) \quad (2b)$$

where TE and TM refer to the axes of polarization of the incident light, TE being parallel and TM being perpendicular, respectively, to the plane of incidence; and n and k are the refractive index and the extinction coefficient of the sample material, respectively. For details of the specific equations used in the art to define the relationship between these variables, see Born, Max and Emil Wolf, "Principles of Optics," 4th Edition, Pergamon Press, Bath, England, at pp. 615 and sequel.

It is known that the optical parameters n and k vary with the wavelength $\lambda$ of the incident light; therefore, for given wavelength and angle of incidence, Equations 2a and 2b can be expressed simply in terms of n an k; that, is, $\Delta\phi = \Delta\phi(n,k)$. Accordingly, the phase change $\Delta\phi$ of incident light of wavelength $\lambda$ reflected from a sample surface can be calculated exactly for each pixel if the refractive index and extinction coefficient at that wavelength and the angle of incidence are known for that pixel. Once a map of such phase shifts $\Delta\Phi(x,y)$ is known, a corrected phase distribution map $\Phi_{CORR}(x,y)$ can be determined by $$\Phi_{CORR}(x,y) = \Phi(x,y) + \Delta\Phi(x,y) \quad (3)$$

and used to calculate a corrected height map using Equation 1, for example, which becomes $$h_{CORR}(x, y) = \frac{\lambda}{4\pi} \Phi_{CORR}(x, y). \quad (4)$$

Prior-art phase shifting techniques have completely neglected this correction because n and k are normally unknown for the material being tested. Also, as mentioned above, this correction is unnecessary for surfaces of similar material.

The quantities n and k are conventionally measured by ellipsometric techniques and vary with the wavelength of the light used for testing. In addition, they are usually not uniform within the surface of the test sample. Therefore, the refractive index and the extinction coefficient of the sample material are point quantities that in practice are not available during phase-shifting measurements for correction of errors introduced by nonuniformities or dissimilarities within the surface of the test sample. This aspect of phase-shifting interferometry remains a problem in the continuing effort to improve the accuracy and resolution of the technique.

The use of a template with defined regions of interest, which are often made of dissimilar materials, provides a practical opportunity to correct phase (and correspondingly height) measurements based on the specific nature of the material of each region and the wavelength used for the measurement. Specifically, each region is assigned correction data to account for these differences. In the simplest mode of implementation of this aspect of the invention, correction factors for phase or height offsets (so-called "pistons") may be stored in computer memory in the form of a table as a function of material and wavelength. It is noted that a different but fixed effective wavelength is usually used with each interferometric procedure. Therefore, the wavelength input is normally tied to the procedure alone (i.e., PSI, VSI or EVSI). During the course of the testing procedure, the user could thus designate the wavelength applicable to the test and select the material corresponding to each region of interest, thereby specifying the correction information necessary to enable the data processing algorithm to correct the heights resulting from the interferometric measurement. An example of such tabulated information is illustrated in FIG. 7.

Alternatively, the system could include algorithms to calculate phase and height corrections for the relevant profilometric procedure and also provide for the interactive specification by a user of the wavelength used and of n and k, the refractive index and the extinction coefficient, respectively, of the materials in the various regions of interest in the sample surface. Such algorithms are well known in the art for all optical profilometric procedures. Equations (1)–(4) above are an example of relationships suitable to implement an algorithm to calculate pistons in a procedure using phase-shifting interferometry.

Thus, the invention discloses a simple procedure for avoiding the time-consuming and often unreliable process of template alignment used in the prior art. The technique is valid for any situation where the outline of a landmark region in the sample surface can be distinguished from the surrounding regions on the basis of some measurable parameter.

The invention has been described for simplicity in terms of a substantially rectangular magnetic-head slider, but the technique could be used in equivalent fashion with any sample geometry suitable for spotting by identifying its contour. Obviously, an appropriate template having the same design geometry of the sample surface must be used. ABS areas have been illustrated as the regions of interest for the invention, but a different kind of sample with different regions (such as the shallower intermediate region or the deeper cavity region of the magnetic head) could be identified and tested in equivalent fashion.

Algorithms for identifying candidate islands of data as the landmark region and for selecting an optimal candidate using contours and/or areas are well within the knowledge of those skilled in the art, as are algorithms for translating the coordinates of the template to overlay the sample (or viceversa). Therefore, these techniques are not described in detail here.

Figure 8:
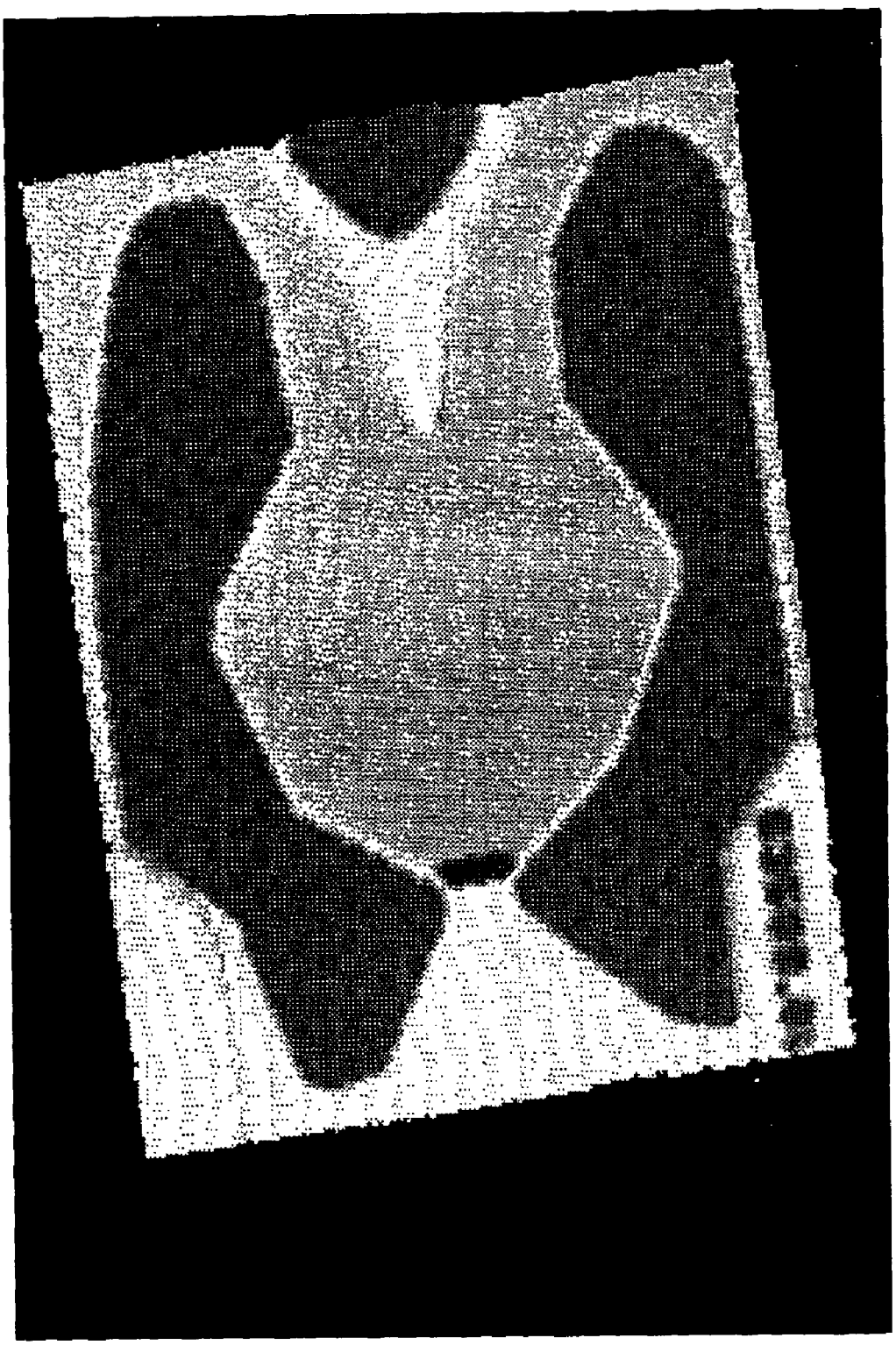
FIG. 8 is a height image of a magnetic-head slider within the field of view of an interferometric microscope objective.
Figure 9:
FIG. 9 is an image showing the outline of the regions of interest of the slider of FIG. 8 as defined by significant height differences between adjacent pixels.
Figure 10:
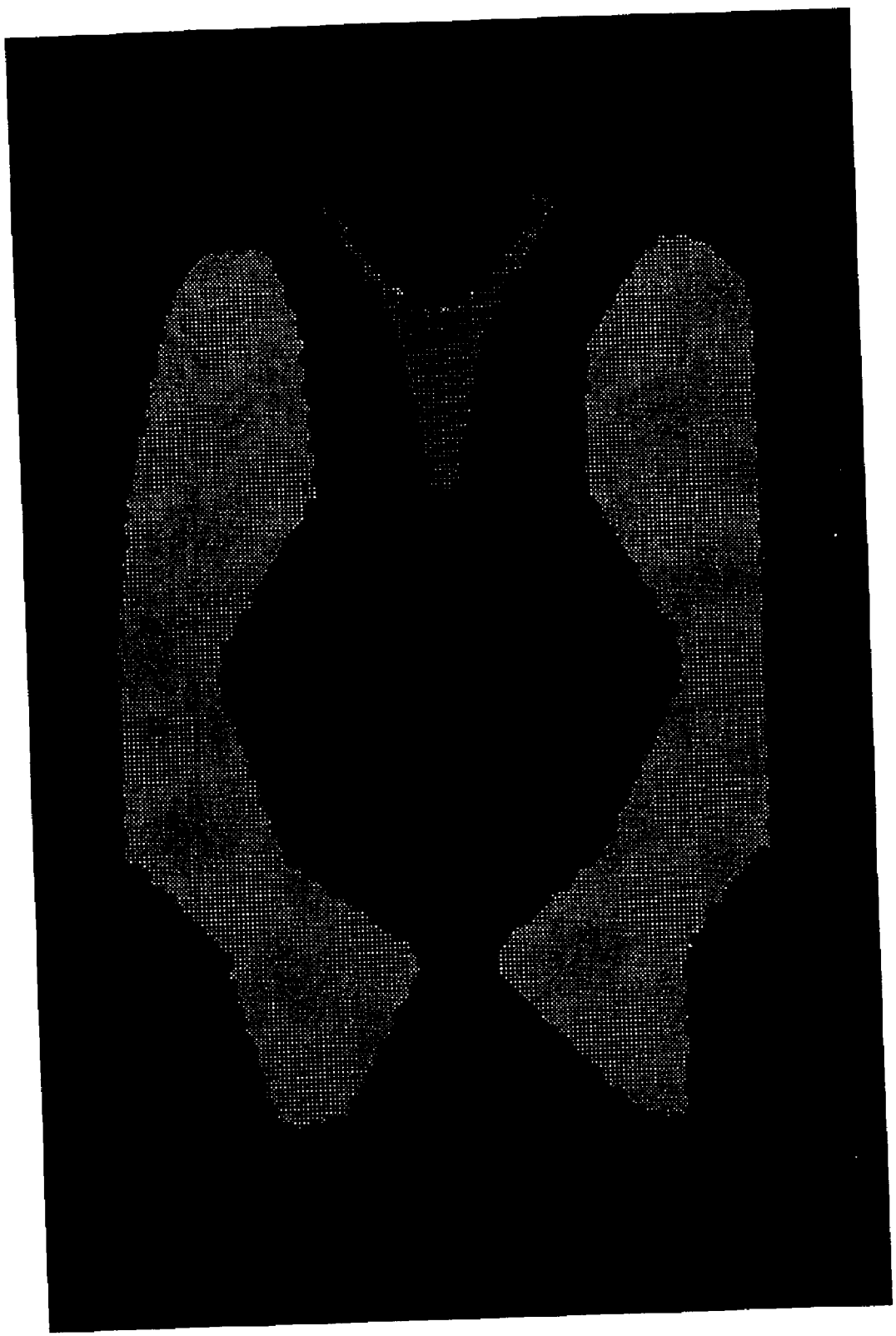
FIG. 10 is the slider of FIG. 8 shown with a template superimposed over the regions of interest according to the invention.
Figure 11:
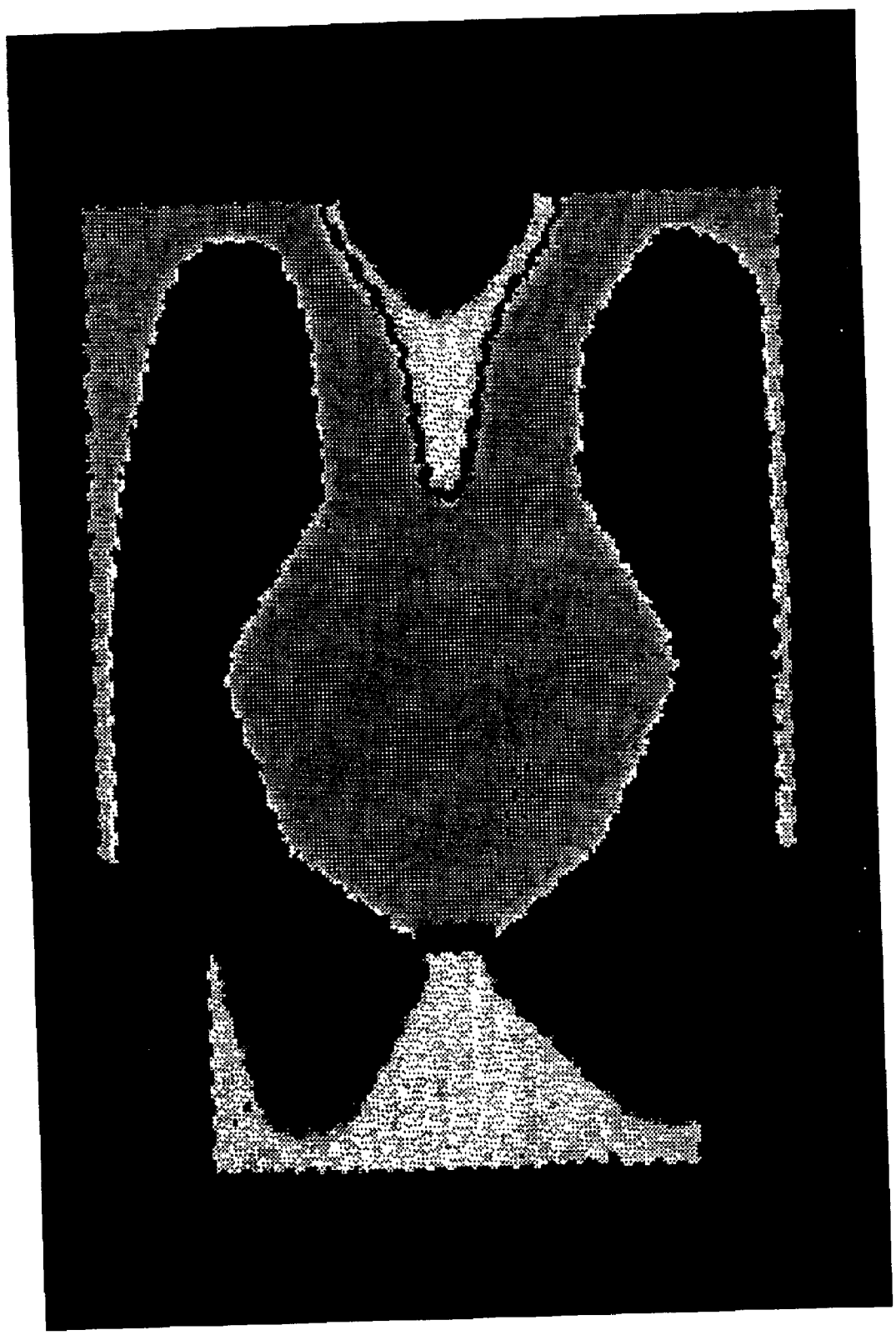
FIG. 11 is an example of the same test part of FIG. 10 where the background cavity is chosen as the region of interest.

An example of the invention is illustrated in FIGS. 8–11. The height map of a magnetic-head slider from Seagate Technology of Scotts Valley, Calif., is shown in FIG. 8 as measured through the field of view of a 3.8× Michelson interferometric objective of a Wyko® HD-3300 interferometer. FIG. 9 shows the contour of the slider and of several regions of interest in the slider defined by the outer line of pixels around each island showing a significant relative height difference. FIG. 10 shows a corresponding template overlaying the slider of interest as it appeared after electronic translation using the left and right ABS rails as landmark regions for alignment purposes according to the invention. The example demonstrates the ease and preciseness with which the invention makes it possible to match templates to the surface of a test sample. FIG. 11 is an example of the same test part where the background cavity is chosen as the region of interest.

It is understood that many equivalent template systems are possible within the scope of the present invention and that those skilled in the art could easily design a special system for a specific application. For example, the process of matching a landmark region in the sample surface with a landmark pattern in the template could be carried out with two corresponding islands instead of only one. Then the process could be reduced to finding a set of island in the sample surface having the same distance between their centers of gravity as the distance between the landmark patterns in the template. (This is the approach used in the example of FIGS. 8–11.)

Thus, various changes in the details and steps that have been described may be made by those skilled in the art within the principles and scope of the invention herein illustrated and defined in the appended claims. While the invention has been shown and described in what are believed to be the most practical and preferred embodiments, it is recognized that departures can be made therefrom within the scope of the invention, which is therefore not to be limited to the details disclosed herein, but is to be accorded the full scope of the claims so as to embrace any and all equivalent apparatus and methods.

We claim:

1. In a system wherein a template with selected patterns is used for identifying and analyzing by profilometric measurements regions of interest in a sample surface, and wherein the template contains a landmark pattern boundary conforming at least to a part of a corresponding landmark region boundary in the sample surface, a method for aligning the selected patterns in the template with the regions of interest in the sample surface comprising the following steps:
    (a) performing profilometric measurements at a plurality of pixels within a field of view containing said landmark region boundary in the sample surface;
    (b) utilizing said profilometric measurements to identify said landmark region boundary in the sample surface that conforms to said landmark pattern boundary in the template, said landmark region boundary being sufficient to characterize a position of the sample surface within the field of view; and
    (c) placing the template within the field of view with said landmark pattern boundary overlaying said landmark region boundary in the sample surface.

2. The method described in claim 1, wherein said step (a) is carried out by optical interferometry.

3. The method described in claim 1, wherein said step (a) is carried out by vertical scanning interferometry.

4. The method described in claim 1, wherein said step (a) is carried out by phase shifting interferometry.

5. The method described in claim 1, wherein said step (a) is carried out extended vertical-scanning interferometry.

6. The method described in claim 1, wherein said step (a) is carried out by confocal microscopy.

7. The method described in claim 1, wherein said step (a) is carried out by optical-coherence tomographic profilometry.

8. The method described in claim 1, wherein said step (a) is carried out by atomic-force profilometry.

9. The method described in claim 1, wherein said step (a) is carried out by stylus profilometry.

10. The method described in claim 1, wherein said step (b) is carried out by utilizing said profilometric measurements to define a plurality of region boundaries in said sample surface, by comparing said plurality of region boundaries with said landmark pattern boundary in the template, and by selecting a region boundary that best fits the landmark pattern boundary to serve as the landmark region boundary in step (c).

11. In a system wherein a template with selected patterns is used for identifying and analyzing by profilometric measurements regions of interest in a sample surface, and wherein the template contains a landmark pattern conforming to a corresponding landmark region in the sample surface, a method for aligning the selected patterns in the template with the regions of interest in the sample surface comprising the following steps:
    (a) performing profilometric measurements at a plurality of pixels within a field of view containing said landmark region in the sample surface;
    (b) utilizing said profilometric measurements to identify said landmark region in the sample surface that conforms to said landmark pattern in the template, said landmark region being sufficient to characterize a position of the sample surface within the field of view; and
    (c) placing the template within the field of view with said landmark pattern overlaying said landmark region in the sample surface.

12. The method described in claim 11, wherein said step (a) is carried out by optical interferometry.

13. The method described in claim 11, wherein said step (a) is carried out by vertical scanning interferometry.

14. The method described in claim 11, wherein said step (a) is carried out by phase shifting interferometry.

15. The method described in claim 11, wherein said step (a) is carried out extended vertical-scanning interferometry.

16. The method described in claim 11, wherein said step (a) is carried out by confocal microscopy.

17. The method described in claim 11, wherein said step (a) is carried out by optical-coherence tomographic profilometry.

18. The method described in claim 11, wherein said step (a) is carried out by atomic-force profilometry.

19. The method described in claim 11, wherein said step (a) is carried out by stylus profilometry.

20. The method described in claim 11, wherein said step (b) is carried out by utilizing said profilometric measurements to define a plurality of regions in said sample surface, by comparing said plurality of regions with said landmark pattern in the template, and by selecting a region that best fits the landmark pattern to serve as the landmark region in step (c).

21. In a system wherein separate regions of interest in a sample surface are analyzed by profilometric measurements, a method for correcting said profilometric measurements to account for dissimilarities in materials in the sample surface, comprising the following steps:
    (a) assigning correction factors to selected patterns in a template corresponding to said regions of interest as a function of the dissimilarities in the materials constituting the regions of interest in the sample surface;
    (b) performing profilometric measurements of said regions of interest; and
    (c) correcting said profilometric measurements using the correction factors assigned to the regions of interest.

22. The method described in claim 21, wherein said step (a) is carried out by storing said correction factors in a computer memory that is automatically accessed while carrying out step (c).

23. The method described in claim 21, wherein said step (b) is carried out by vertical-scanning interferometry.

24. The method described in claim 23, further comprising the step of providing an algorithm for calculating correction factors as a function of material properties and light-source wavelength, and wherein the algorithm is used to calculate said correction factors assigned in step (a).

25. The method described in claim 21, wherein said step (b) is carried out by phase-shifting interferometry.

26. The method described in claim 24, further comprising the step of providing an algorithm for calculating correction factors as a function of material properties and light-source wavelength, and wherein the algorithm is used to calculate said correction factors assigned in step (a).

27. The method described in claim 21, wherein said step (b) is carried out by interferometric profilometry.

28. In a system wherein a template with selected patterns is used for identifying and analyzing by profilometric measurements regions of interest in a sample surface, and wherein the template contains a landmark pattern boundary conforming at least to a part of a corresponding landmark region boundary in the sample surface, apparatus for aligning the selected patterns in the template with the regions of interest in the sample surface comprising the following:

(a) a profilometer for performing profilometric measurements at a plurality of pixels within a field of view containing said landmark region boundary in the sample surface;

(b) means for identifying said landmark region boundary in the sample surface that conforms to said landmark pattern boundary in the template utilizing said profilometric measurements, said landmark region boundary being sufficient to characterize a position of the sample surface within the field of view; and (c) means for placing the template within the field of view with said landmark pattern boundary overlaying said landmark region boundary in the sample surface.

29. The apparatus described in claim 27, wherein said profilometer is an interferometric profiler.

30. In a system wherein a template with selected patterns is used for identifying and analyzing by profilometric measurements regions of interest in a sample surface, and wherein the template contains a landmark pattern conforming to a corresponding landmark region in the sample surface, apparatus for aligning the selected patterns in the template with the regions of interest in the sample surface comprising the following:

(a) a profilometer for performing profilometric measurements at a plurality of pixels within a field of view containing said landmark region in the sample surface;

(b) means for identifying said landmark region in the sample surface that conforms to said landmark pattern in the template utilizing said profilometric measurements, said landmark region being sufficient to characterize a position of the sample surface within the field of view; and (c) means for placing the template within the field of view with said landmark pattern overlaying said landmark region in the sample surface.

31. The apparatus described in claim 30, wherein said profilometer is an interferometric profiler.

32. In a system wherein separate regions of interest in a sample surface are analyzed by profilometric measurements, apparatus for correcting said profilometric measurements to account for dissimilarities in materials in the sample surface, comprising the following steps:

(a) means for assigning correction factors to selected patterns in a template corresponding to said regions of interest as a function of the dissimilarities in the materials constituting the regions of interest in the sample surface;

(b) a profilometer for performing profilometric measurements of said regions of interest; and (c) means for correcting said profilometric measurements using the correction factors assigned to the regions of interest.

33. The apparatus described in claim 32, wherein said profilometer is an interferometric profiler.

* * * * *